Nov. 18, 1952     R. E. VON RUDEN     2,618,350
MOUNTING MEANS FOR CHAIN SAWS AND THE LIKE
Filed Sept. 23, 1949     2 SHEETS—SHEET 1
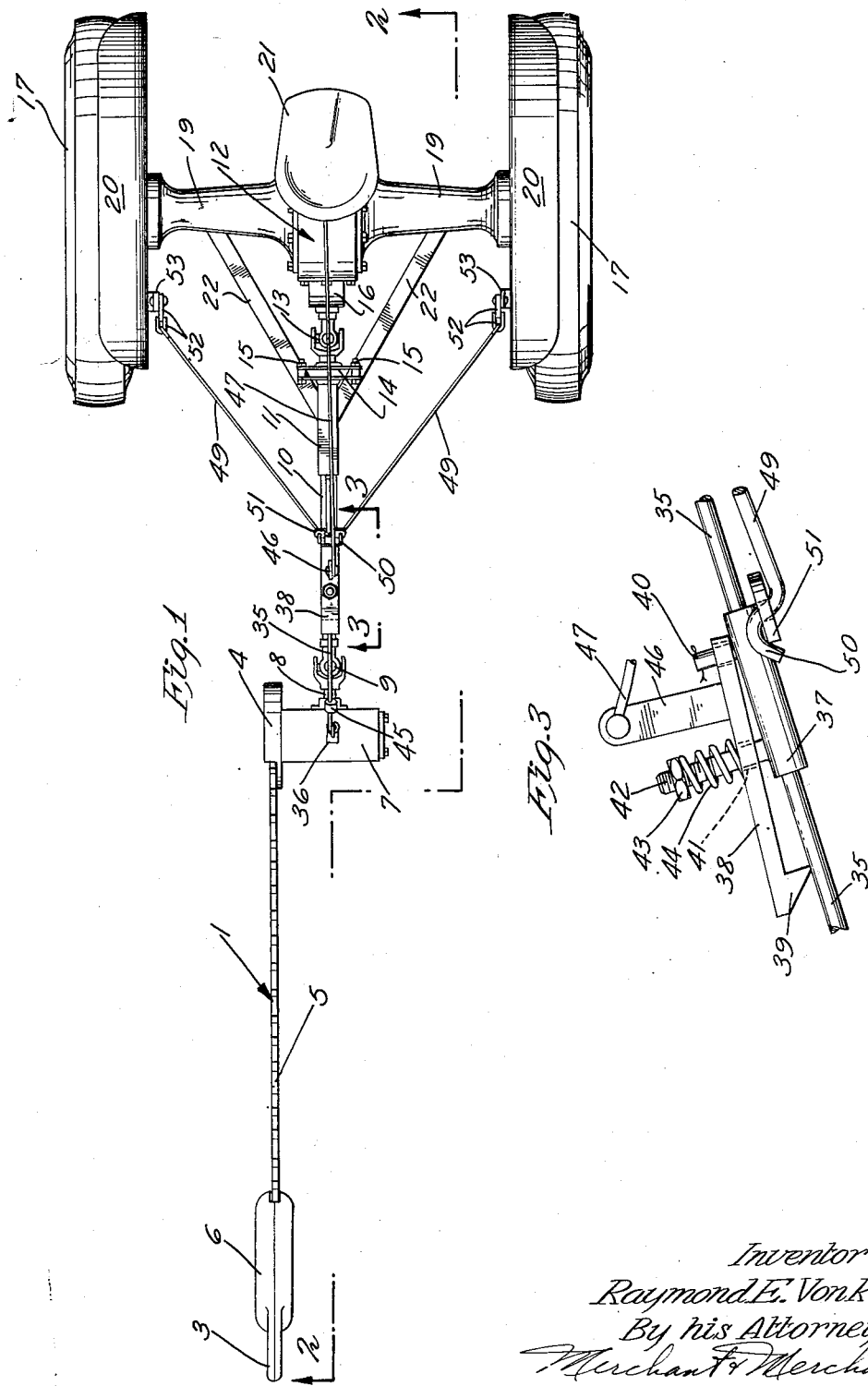

Nov. 18, 1952  R. E. VON RUDEN  2,618,350
MOUNTING MEANS FOR CHAIN SAWS AND THE LIKE
Filed Sept. 23, 1949  2 SHEETS—SHEET 2
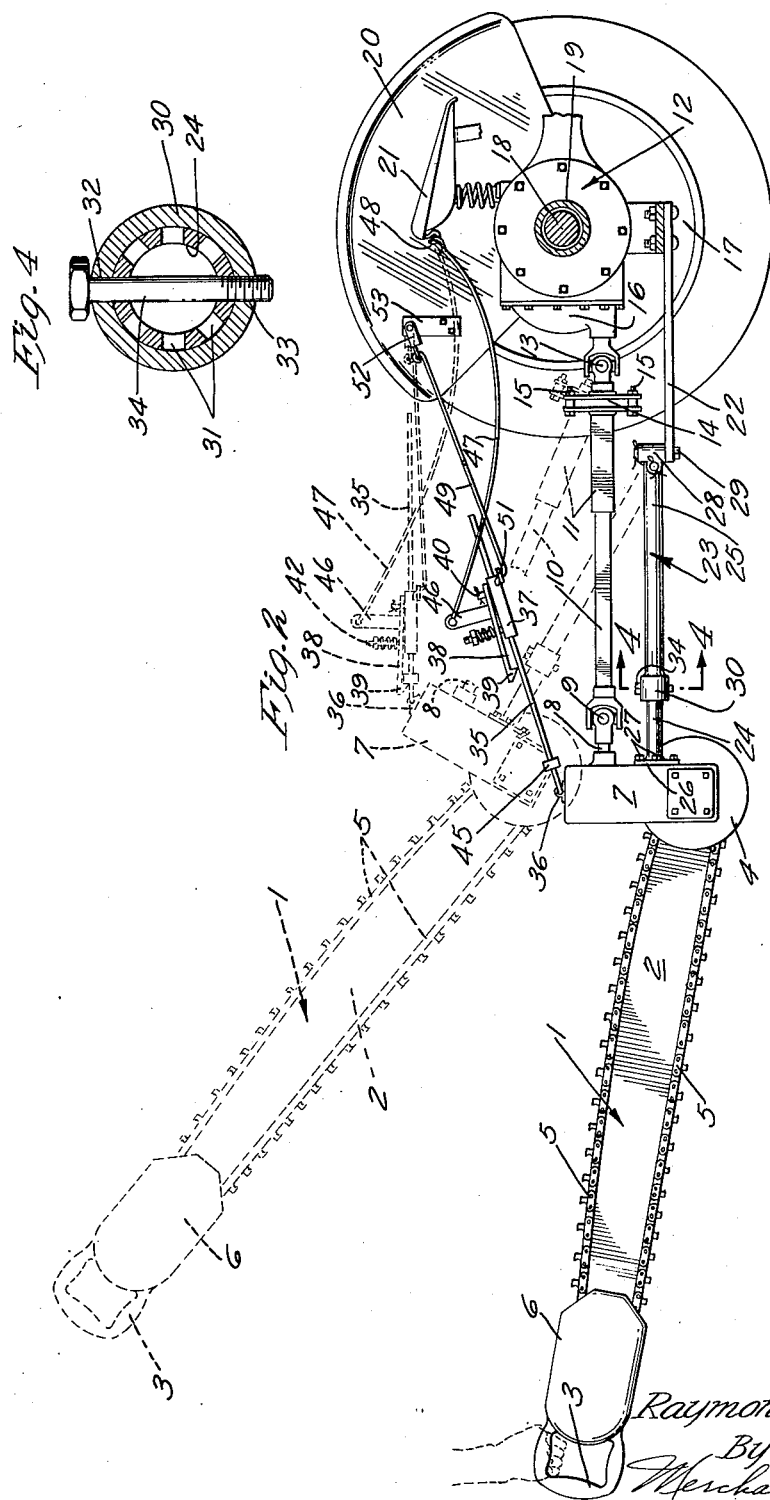
Inventor
Raymond E. Von Ruden
By his Attorneys
Merchant & Merchant Patented Nov. 18, 1952

2,618,350

UNITED STATES PATENT OFFICE 2,618,350

MOUNTING MEANS FOR CHAIN SAWS AND THE LIKE

Raymond E. Von Ruden, Claremont, Minn.

Application September 23, 1949, Serial No. 117,307

1 Claim. (Cl. 180—53)

My invention relates to power-driven saws of the endless chain type and, more particularly, to novel means for connecting the same to a mobile source of power such as a tractor.

The primary object of my invention is the provision of novel means for connecting a chain-type saw to a tractor whereby the saw may readily be adjustably set in any one of a number of given positions varying from the horizontal to the vertical.

Another object of my invention is the provision of means for coupling a power-driven chain saw to a tractor, whereby to permit a maximum freedom of movement of the saw in any desired direction.

Another highly important object of my invention is the provision of means for connecting chain saws and the like to the power take-off of a tractor, which is extremely inexpensive to produce, rugged in construction, durable in use and easy to operate and adjust.

A still further important object of my invention is the provision of novel means for supporting chain saws and the like which are connected to the power take-off of a tractor in an elevated position for transportation, storage and the like.

The above and other highly important objects and advantages will become apparent from the following detailed specification, appended claim and attached drawings.

Referring to the drawings, in which like characters indicate like parts throughout the several views:

Fig. 1 is a view in plan of a power-driven chain saw coupled to the rear end of a tractor, some parts of the tractor being omitted;

Fig. 2 is a view partly in section and partly in side elevation taken substantially on the line 2—2 of Fig. 1;

Fig. 3 is an enlarged fragmentary detail in side elevation as seen from the line 3—3 of Fig. 1; and Fig. 4 is a transverse section taken on the line 4—4 of Fig. 2 on an enlarged scale.

Referring with greater detail to the drawings, a conventional power saw of the endless chain type is indicated in its entirety by the numeral 1 and comprises a guide bar 2 having at one end a handle member 3 and at its opposite end a driving head 4. A chain saw 5 is adapted to run over the guide bar 2 and suitable sprocket wheels, not shown, but contained within the driving head 4 and a housing 6 adjacent the handle member 3. The driving head 4 is rigidly secured to a transmission box 7 which contains conventional driving gears, not shown, but which are connected to an input shaft 8 projecting laterally from one side of the transmission box 7. The input shaft 8 is rigidly secured to a universal joint 9 at one end of a drive shaft section 10 which is telescoped within a cooperating drive shaft section 11 connected to the power take-off of a tractor 12. Interposed between the drive shaft section 11 and the power take-off of the tractor 12 is a universal joint 13 and a safety coupling 14 having shear bolts or the like 15. The power take-off of the tractor is not shown, being conventional in nature and contained within a gear housing 16. The tractor 12 is shown as having pneumatic tire-equipped rear driving wheels 17, a rear driving axle 18, contained within an axle housing 19, and wheel fenders 20. The operator's seat is indicated at 21. The tractor 12 is provided with the conventional rearwardly extending drawbar 22.

I provide means for coupling the saw 1 to the drawbar 22 of the tractor 12, which means comprises a coupling arm 23 made up of coupling arm sections 24 and 25. The rear coupling arm section 24 has a flanged outer end 26 which is rigidly secured to the transmission box 7 by bolts or the like 27. The front coupling arm section 25 is horizontally pivoted at its front end to the coupling head 28 that is, in turn, pivotally mounted to the drawbar 22 of the tractor on a vertical axis by a pin or the like 29. This arrangement provides for compound swinging movements of the transmission box 7 and parts carried thereby in all directions with respect to the tractor 12. The rear end of the coupling arm section 25 has a diametrically enlarged head 30 which is adapted to receive the front end of the coupling arm section 24. As shown in Fig. 4, the front end portion of the coupling arm section 24 is provided with circumferentially spaced diametrically opposed apertures 31 which are selectively alignable with a pair of aligned apertures 32 and 33 in the head 30. The aperture 33 is screw-threaded to receive the threaded end of a locking bolt or the like 34 which extends through the aperture 32 and diametrically opposed openings 31 in the coupling arm section 24. Removal of the bolt 34 permits rotation of the arm section 24 with respect to the arm section 25; the arm section 24, transmission box 7 and parts carried thereby being locked in any desired set position by reinsertion of the bolt 34. The chain saw 1 is shown as being mounted for sawing movements in a vertical plane. Rotation with respect to the arm 23 will permit sawing movements in a horizontal plane and angular sawing movements therebetween and the vertical plane.

During its operation, the saw 1 is normally supported at its outer free end by engagement of the handle 3 by the operator. I provide means for supporting the saw 1 in spaced relation to the ground when the saw is not in use, said means consisting of tie rods and a latch mechanism therefor. A single tie rod section 35 is secured at its rear end to the top of the transmission box 7 by a hinge coupling or the like 36. Slidably mounted on the tie rod section 35 is a head 37 having loosely mounted thereon a latch bar element 38 terminating at its rear end with a latch detent 39. As indicated in Fig. 3, the latch bar element 38 is loosely mounted on an upstanding pin 40 welded or otherwise rigidly secured to the head 37. Intermediate its ends, the latch bar element 38 is provided with an aperture 41 through which loosely extends a guide post 42 which projects upwardly from the rear end portion of the head 37 and which is threaded at its upper end to receive an adjusting nut 43. The latch bar element 38 is biased in a downward direction by a coil compression spring 44 interposed therebetween and the nut 43. Bias of the spring 44 upon the latch bar element 38 is varied by turning the nut 43 upon the guide post 42. The latch detent 39 is adapted to engage a latch dog in the nature of a collar or the like 45 rigidly secured to the tie rod section 35 toward the rear end portion thereof, when the head 37 and parts carried thereby are moved rearwardly with respect to the tie rod section 35. Means for releasing the latch detent 39 from the latch dog 35 includes a release arm 46 projecting upwardly from the rear end portion of the latch bar element 38 and a flexible cable 47 secured to the upper end of the arm 46 and having its forward end fastened to a convenient portion of the tractor 12, such as a hook 48 on the seat 21 thereof.

The head 37 is supported from laterally spaced points on the tractor 12 by a pair of diverging tie rod sections 49. The converging rear ends of the tie rods 49 are provided with parallel hook-like elements 50 which extend through suitable apertures in a cross bar 51 rigidly secured to the front end of the head 37 by welding or the like, see particularly Fig. 3. The front ends of the tie rod sections 49 may be secured to any suitable portion of the tractor 12 but preferably, and as shown, are fastened by links 52 to brackets 53 rigidly mounted on the fenders 20 of the tractor 12, and for pivotal movements about a horizontal axis extending transversely of the path of travel of the tractor 12.

Normally, the diverging tie rod sections 49 prevent lateral swinging movements of the coupling arm 23, the transmission box 7 and the saw 1, while permitting swinging movements thereof in a vertical plane when the latch detent 39 is disengaged from the latch dog 45. The hook elements 50 on the converging ends of the tie rod sections 49 may be quickly and easily disengaged from the cross bar 51 simply by swinging the coupling arm 23 and parts carried thereby from the full line position of Fig. 2 and buckling the tie rod section 35 and the sections 49 upwardly. With the tie rod section 49 uncoupled from the cross bar 51, the coupling arm 23, transmission box 27 and saw 1 are free for compound swinging movements in any desired direction. As indicated by dotted lines in Fig. 2, when the latch dog 45 is engaged by the latch detent 39, the tie rods 35 and 49 support the saw in an inoperative position for storage or transport. Release of the saw 1 from the elevated position to an operative position shown by full lines in Fig. 2 is accomplished by a forward pull on the flexible cable 47, which raises the latch detent 39 out of engagement with the latch dog 45. The telescoping of the drive shaft section 10 within the drive shaft section 11 assures a positive driving connection between the power take-off of the tractor 12 with the sawing chain 5 in all positions of the saw 1.

My invention has been thoroughly tested and found to be adequate for the accomplishment of the objectives set forth; and while I have shown a commercial embodiment of my device, it will be understood that the same is capable of modification within the spirit and scope of the invention as defined in the claim.

What I claim is:

A device of the class described adapted to be coupled to a drawbar-equipped tractor having a power take-off, said device comprising a transmission box, a coupling arm made up of two sections, one of which is rigidly secured to said transmission box and the other of which is adapted to be secured to said drawbar through the medium of a compound pivot permitting vertical and horizontal swinging movements, said arm sections being secured together through the medium of a socket-like head on one of said sections, and a bolt passable transversely through said socket like head and circumferentially-spaced alignable openings in the other of said sections whereby to permit rotatable adjustments of one section with respect to the other thereof, a drive shaft between the power take-off of said tractor and said transmission box and having universal joints at its opposite ends, a tie rod section pivotally secured to said transmission box at its rear end and slidably connected to a head at its forward end, a second tie rod section pivotally secured to said head and to said tractor, a latch dog on said first-mentioned tie rod section, a latch detent carried by said head and in the path of travel of said latch-dog upon forward sliding movements of said first mentioned tie rod section, and means biasing said latch detent toward engagement with said latch dog, whereby to retain the transmission box and associated mechanism in an elevated position for transportation.

RAYMOND E. VON RUDEN.

REFERENCES CITED

The following references are of record in the file of this patent:

UNITED STATES PATENTS

| Number | Name | Date |
|---|---|---|
| 1,428,194 | Von Meyenburg | Sept. 5, 1922 |
| 1,496,999 | Ray | June 10, 1924 |
| 1,935,811 | Metcalf | Nov. 21, 1933 |
| 2,051,195 | Arsneau | Aug. 18, 1936 |
| 2,223,002 | Ferguson | Nov. 26, 1940 |
| 2,410,508 | Lamme | Nov. 5, 1946 |